(12) United States Patent
Larsen

(10) Patent No.: US 11,190,096 B2
(45) Date of Patent: Nov. 30, 2021

(54) SWITCHED CAPACITOR DC-DC CONVERTER COMPRISING EXTERNAL AND INTERNAL FLYING CAPACITORS

(71) Applicant: GN Hearing A/S, Ballerup (DK)

(72) Inventor: Dennis Øland Larsen, Lyngby (DK)

(73) Assignee: GN Hearing A/S, Ballerup (DK)

( * ) Notice: Subject to any disclaimer, the term of this patent is extended or adjusted under 35 U.S.C. 154(b) by 0 days.

(21) Appl. No.: 16/188,870

(22) Filed: Nov. 13, 2018

(65) Prior Publication Data
US 2019/0149041 A1 May 16, 2019

(30) Foreign Application Priority Data
Nov. 14, 2017 (EP) ..................................... 17201718

(51) Int. Cl.
*H02M 3/07* (2006.01)
*H02J 7/00* (2006.01)
*H02M 1/088* (2006.01)
*H04R 25/00* (2006.01)
*H02J 7/34* (2006.01)
*H02M 1/00* (2006.01)

(52) U.S. Cl.
CPC ............. *H02M 3/07* (2013.01); *H02J 7/0013* (2013.01); *H02M 1/088* (2013.01); *H04R 25/602* (2013.01); *H02J 7/345* (2013.01); *H02M 2001/007* (2013.01); *H02M 2003/072* (2013.01); *H04R 2225/31* (2013.01); *H04R 2225/33* (2013.01)

(58) Field of Classification Search
CPC ........ H02M 3/07; H02M 1/088; H02J 7/0013; H04R 25/602

USPC .................................................... 307/151, 82
See application file for complete search history.

(56) References Cited

U.S. PATENT DOCUMENTS

| 8,258,857 B2 * | 9/2012 | Adkins | H02M 3/07 |
| | | | 327/536 |
| 10,027,223 B1 * | 7/2018 | Zhang | H02M 3/07 |
| 2007/0091665 A1 | 4/2007 | Oh et al. | |
| 2009/0237146 A1 | 9/2009 | Jurasek et al. | |
| 2012/0049936 A1 | 3/2012 | Akins et al. | |
| 2015/0097538 A1 | 4/2015 | Le et al. | |
| 2017/0188144 A1 * | 6/2017 | Vinter | G05F 3/205 |

(Continued)

FOREIGN PATENT DOCUMENTS

| EP | 2846448 A1 | 3/2015 |
| WO | WO 2016/110413 | 7/2016 |
| WO | WO 2017/143044 | 8/2017 |

OTHER PUBLICATIONS

Extended European Search Report dated May 14, 2018 for corresponding EP Application No. 17201718.8.

(Continued)

*Primary Examiner* — Michael R. Fin
(74) *Attorney, Agent, or Firm* — Vista IP Law Group LLP

(57) ABSTRACT

The present disclosure relates to an integrated circuit switched capacitor DC-DC converter which comprises a first switched capacitor converter based on at least one external flying capacitor and a second switched capacitor converter which comprises a plurality of internal flying capacitors. A controller is configured to select a converter topology of the first switched capacitor converter and a select a converter topology of the second switched capacitor converter.

43 Claims, 5 Drawing Sheets

(56) References Cited

U.S. PATENT DOCUMENTS

2018/0026518 A1* 1/2018 Liu .................... H02M 3/1584
                                                    323/312
2019/0260306 A1* 8/2019 Ma ....................... H02M 3/156

OTHER PUBLICATIONS

Foreign Office Action dated Feb. 10, 2021 for related EP Appln. No. 17201718.8.
Foreign Office Action dated Feb. 4, 2020 for related EP Appln. No. 17201718.8.

* cited by examiner

SWITCHED CAPACITOR DC-DC CONVERTER COMPRISING EXTERNAL AND INTERNAL FLYING CAPACITORS

RELATED APPLICATION DATA

This application claims priority to, and the benefit of, European Patent Application No. 17201718.8 filed on Nov. 14, 2017. The entire disclosure of the above application is expressly incorporated by reference herein.

FIELD

The present disclosure relates to an integrated circuit switched capacitor DC-DC converter which comprises a first switched capacitor converter based on at least one external flying capacitor and a second switched capacitor converter which comprises a plurality of internal flying capacitors. A controller is configured to select a converter topology of the first switched capacitor converter and a select a converter topology of the second switched capacitor converter.

BACKGROUND

Switched capacitor DC-DC power converters are known in the art and have been utilized in various types of portable communication devices such as head-wearable hearing devices. Switched capacitor DC-DC power converters are utilized to convert a DC input voltage from an energy or power source, such as a rechargeable battery, of the portable communication device into a higher or lower DC output voltage suitable for powering various types of integrated circuits and other active components. Switched capacitor DC-DC power converters possess certain attractive properties compared to their inductor-based counterparts—for example a relatively low level of EMI, because there is not stored energy in magnetic fields of inductors. Switched capacitor DC-DC power converters may have small size and high energy conversion efficiency. Different topologies of switched capacitor DC-DC power converters are capable of providing DC voltage step-up (i.e. boost) and DC voltage step-down (i.e. buck) with a topology dependent optimum voltage conversion ratio for example 1:2 or 1:3 step-up conversion and 2:1 and 3:1 step-down conversion.

Switched capacitor DC-DC converters are highly useful for powering head-wearable hearing devices where the compact dimensions of the housing or custom shell in conjunction with small battery capacity typically place severe constraints on size, power conversion efficiency and electromagnetic emissions of the power supply circuitry.

However, it remains a challenge to maintain high energy conversion efficiency of existing switched capacitor DC-DC converters in application where the DC input voltage varies over a large voltage range and likewise in applications where the load power or load current shows great variation. With respect to the varying level of the DC input voltage of the SC DC-DC converter, numerous types of rechargeable battery sources such as Li-ion battery cells exhibit a large voltage variation for example from about 4.2 V at a fully charged state to about 3.0 V at a discharged state. With respect to the varying load power this may be caused by power consumption fluctuations of various types of consumers, e.g. circuit blocks or modules, e.g. flash memory, RF transceiver etc., powered by the switched capacitor DC-DC converter. Some of these consumers may by nature exhibit highly variable power consumption, e.g. an audio power amplifier of a hearing device, or exhibit highly variable power consumption because they are only temporarily activated. The latter type of consumers may reside in sleep-mode/power-down during long time periods interrupted by relatively brief bursts of activity leading to corresponding bursts of power consumption.

Fully integrated switched capacitor DC-DC converters are often capable of achieving high energy conversion efficiency at small output power levels because a large number of flying capacitors and a correspondingly large number of converter topologies can readily be designed in integrated format where the flying capacitors are integrally formed on the semiconductor die or circuit, i.e. on-chip. The large number of converter topologies means that the intrinsic energy efficiency of the switched capacitor DC-DC converter can be kept high despite a large variation of the DC input voltage. However, fully integrated switched capacitor DC-DC converters are typically unable to support large load power levels because of the limited capacitance of integrated flying capacitors and practical limits to the switching frequency. On the other hand, it is often impractical to achieve high intrinsic energy efficiency in switched capacitor DC-DC converters based on external flying capacitors, i.e. off-chip, flying capacitors. The need to dispose a large number of separate flying capacitors and associated wire routing and interconnect pins on a carrier board is impractical, in particular for compact portable communication devices such as mobile phones, head-wearable hearing devices etc.

Hence, there remains a need in the art for switched capacitor DC-DC converters with improved performance characteristics such as smaller dimensions and better adaptation to varying load conditions and varying DC input voltages. In particular improved switched capacitor DC-DC converters which are capable of delivering large load power bursts without compromising energy conversion efficiency at normal or ordinary and typically much smaller load power levels.

SUMMARY

A first aspect relates to an integrated circuit switched capacitor DC-DC converter comprising a first switched capacitor converter which comprises:
  a DC input for receipt of a battery supply voltage,
  a first switch array comprising a plurality of individually controllable semiconductor switches connectable to at least one external flying capacitor to form one or more individual converter topologies of the first switched capacitor converter for converting the battery supply voltage into an intermediate voltage. The integrated circuit switched capacitor DC-DC converter additionally comprises a second switched capacitor converter which comprises:
an input connected to the intermediate voltage,
  a second switch array comprising a plurality of individually controllable semiconductor switches and a plurality of internal flying capacitors, e.g. two, three, or four, configurable to form a plurality of individual converter topologies for converting the intermediate voltage into a DC output voltage. The integrated circuit switched capacitor DC-DC converter furthermore comprises a controller connected to respective control terminals of the respective individually controllable semiconductor switches of the first and second switch arrays to select a converter topology of the first switched capacitor converter and select a converter topology of the second switched capacitor converter.

The battery supply voltage may be supplied by rechargeable battery cell(s) or disposable battery cell or cells delivering the battery supply voltage to the DC input of the integrated circuit switched capacitor DC-DC converter. The battery cell or cells may for example comprise a disposable Zn-Air battery or may comprise at least one rechargeable Li-Ion battery cell. Li-Ion battery cells supply a nominal battery voltage of around 4.0 V but the battery voltage varies considerably from about 4.2 V in a fully charged state to about 3.0 V in a discharged state. Other types of rechargeable battery cell(s) often exhibit similar variations of battery voltage depending on the charge state of the cell(s).

The integrated circuit switched capacitor DC-DC converter may be configured as a step-down converter. The first switched capacitor converter may be configured to step-down the battery voltage by 2:1, 3:2 or 3:1 by the controller by a suitable selection of the topology of the first switched capacitor converter. The second switched capacitor converter may comprise a large number of selectable converter topologies for example comprising those specified in Table 1 below under n=3. The controller may be configured to determine and select the particular converter topology, of the number of selectable converter topologies, which exhibits the highest intrinsic energy efficiency at the intermediate voltage supplied by the first converter and the desired DC output voltage as discussed in further detail below with reference to the appended drawings. The controller may therefore be configured to dynamically switch between different topologies of the second switched capacitor DC-DC converter in response to variations of battery supply voltage and/or variation of the DC output voltage to repeatedly maximize the intrinsic energy efficiency of the second switched capacitor DC-DC converter. Certain embodiments of the controller may additionally be configured to switch between the different topologies of the second switched capacitor DC-DC converter in response to variations of the intermediate voltage. This may be achieved by comparing the intermediate voltage to a certain threshold voltage and switch topology of the intermediate voltage exceeds this threshold voltage.

The skilled person will understand that the first and second switched capacitor converters of the integrated circuit switched capacitor DC-DC converter are series connected from the DC input, receiving the battery supply voltage, to the DC output voltage since the intermediate voltage outputted by the first switched capacitor converter is connected to the input of the second switched capacitor converter. This series connection means that the first switched capacitor converter shields the second switched capacitor converter from receipt of a full battery voltage level. This means that the plurality of controllable semiconductor switches of the second converter may be implemented as standard low-voltage semiconductor transistors instead of high-voltage devices with the advantages discussed in further detail below with reference to the appended drawings.

The intermediate voltage, at the input of the second switched capacitor DC-DC converter, may be unconnected to any pad or terminal of the integrated circuit or semiconductor die or chip, i.e. not externally accessible. That embodiment therefore operates without any off-chip smoothing capacitor coupled to the intermediate voltage leading to a beneficial reduction of external components and chip area The at least one external flying capacitor(s) of the first switched capacitor converter is external, i.e. off-chip, relative to an integrated circuit holding the residual circuitry of the switched capacitor DC-DC converter. Hence, the at least one external flying capacitor(s) may be arranged on a carrier board, such as single-layer of multilayer printed circuit board (PCB) holding the integrated circuit. The plurality of internal flying capacitors of the second switched capacitor converter is integrated on the integrated circuit, i.e. on the semiconductor die or chip. The second switched capacitor converter may for example comprise more than two, three, four or five internal flying capacitors. The integrated property of the plurality of internal flying capacitors tend to limit the maximum capacitance of the flying capacitors due to a relatively low capacitance per area or capacitance density available on integrated circuits as discussed in further detail below with reference to the appended drawings. However, a large number of flying capacitors means that the intrinsic energy efficiency of the second switched capacitor DC-DC converter can be kept high over large variations of the DC input voltage and/or variations of the DC output voltage for the reasons discussed previously.

According to one embodiment of the integrated circuit switched capacitor DC-DC converter, the controller is configured for determining, directly or indirectly, a charge state of the at least one external flying capacitor, comparing the charge state to a predetermined charge criterion, recharging the at least one external flying capacitor via the first switch array in response to compliance with the predetermined charge criterion. The controller may be configured to recharge the at least one external flying capacitor by toggling respective states of first and second pairs of individually controllable semiconductor switches of the first switch array to connect the least one external flying capacitor between the DC input, delivering the battery supply voltage, and the input of the second switched capacitor converter as discussed in further detail below with reference to the appended drawings.

According to one embodiment of the integrated circuit switched capacitor DC-DC converter, the controller is configured to:

recharging the at least one external flying capacitor at a default or minimum switching frequency, e.g. higher than 16 kHz, irrespective of the predetermined charge state to set a lower bound of the switching frequency of the first switched capacitor converter. By selecting a minimum switching frequency above the audio band, e.g. higher than 16 kHz or higher than 20 kHz, the controller prevents switching frequency noise on the DC output voltage and on other power supply rails from leaking into audio signals of various types audio processing circuitry that may be powered by the integrated circuit switched capacitor DC-DC converter.

The integrated circuit switched capacitor DC-DC converter preferably comprises a clock generator which generates a clock signal and derives at least one pair of non-overlapping clock phases therefrom for controlling the state switching of the plurality of individually controllable semiconductor switches of each of the first and second switch arrays. In some embodiments, the individually controllable semiconductor switches of the first converter section and the individually controllable semiconductor switches of each of the first and second switch arrays may be driven by the synchronous non-overlapping clock phases even though the frequency of the non-overlapping clock phases of the first switch array may be significantly lower than the frequency of the non-overlapping clock phases of the second switch array as discussed in further detail below with reference to the appended drawings.

The integrated circuit switched capacitor DC-DC converter may comprise:
a first controllable bypass switch (SWBP1) and a second controllable bypass switch (SWBP2) configured to:
in a first state, connect the at least one external flying capacitor in series between the DC input and the DC output voltage,
in a second state, connect the at least one external flying capacitor between a negative supply rail and the DC output voltage; thereby bypassing the second switched capacitor converter.

The first and second controllable bypass switches, i.e. a bypass circuit, allows the controller to switch the switched capacitor DC-DC converter between two distinct modes of operation. A first mode of operation can be viewed as a normal mode of operation where the output of the first switched capacitor converter essentially charges the input of the second switched capacitor converter and a second mode of operation which can be viewed as a "high-power" mode where the output of the first switched capacitor converter essentially charges the DC output voltage directly. The high-power mode enables this embodiment of the switched capacitor DC-DC converter to deliver a large load power bursts without compromising the energy conversion efficiency at normal or ordinary load power levels as discussed in further detail below with reference to the appended drawings.

The first controllable bypass switch may be configured to selectively connect and disconnect a first terminal of the at least one external flying capacitor and the DC output voltage in accordance with a first switch control signal supplied by the controller and the second controllable bypass switch (SWBP2) is configured to selectively connecting and disconnecting a second terminal of the at least one external flying capacitor and the DC output voltage in accordance with a second switch control signal supplied by the controller.

According to yet another embodiment the controller is configured to: generate the first switch control signal, of the first pair of individually controllable semiconductor switches, synchronously to the first clock phase ($p_1$) of the clock signal; and
generate the second switch control signal, of the second pair of individually controllable semiconductor switches, synchronously to the second clock phase ($p_2$) of the clock signal.

The second switched capacitor converter preferably comprises an output voltage regulator e.g. based on a feedback mechanism. The output voltage regulator may comprise:
a reference voltage input for receipt of a first DC reference voltage and a feedback voltage input for receipt of a feedback voltage representative of the DC output voltage,
an error signal generator configured to combine the first DC reference voltage and the feedback voltage to determine a control signal. The controller being configured to generate respective clock phases for the plurality of individually controllable semiconductor switches of the second switch array to adjust the DC output voltage. Various exemplary control schemes that may be utilized by the output voltage regulator to control the DC output voltage are discussed in further detail below with reference to the appended drawings.

The controller may be configured to select the topology of the second switched capacitor converter such that an intrinsic energy efficiency of the second switched capacitor converter is maximum;
said intrinsic energy efficiency being $\eta_1 = VCR/iVCR = Vo1/(Vint*iVCR)$;
$\eta_1$ = Intrinsic energy efficiency of the second switched capacitor converter at the set-point voltage of the DC output voltage;
VCR = voltage conversion ratio of selected converter topology;
iVCR = ideal voltage conversion ratio;
Vint = Intermediate voltage.

A total capacitance of the at least one external flying capacitor may be larger than 500 nF or larger than 2 µF; and/or a total capacitance of the plurality of internal flying capacitors, i.e. on-chip capacitors, may be smaller than 100 nF or 22 nF—such as smaller than 5 nF.

A second aspect relates to a head-wearable hearing device comprising an integrated circuit switched capacitor DC-DC converter according to any of the above-described embodiments thereof and at least one rechargeable battery cell, such as one or more Li-Ion battery cell(s), connectable to the DC input for supplying the battery supply voltage.

The head-wearable hearing device may comprise a hearing instrument or hearing aid such as a BTE, RIE, ITE, ITC, or CIC, etc. The hearing aid may comprise one or several microphone(s) for picking-up sound from the external environment of the hearing instrument and generate a first audio signal in response. The head-wearable hearing device may alternatively be a headset, headphone, earphone, ear defender, or earmuff, etc., such as an Ear-Hook, In-Ear, On-Ear, Over-the-Ear, Behind-the-Neck, Helmet, or Headguard, etc.

The head-wearable hearing device may comprise various active components and audio transducers for receipt of incoming speech and other sound signals, processing of received sound signals and conversion of the processed sound signals into a corresponding output sound signal for application to a user's ear and/or transmission to a remote listener.

An integrated circuit switched capacitor DC-DC converter includes: a first switched capacitor converter comprising: a DC input for receipt of a battery supply voltage, and a first switch array comprising a first plurality of individually controllable semiconductor switches connectable to at least one external flying capacitor to form one or more individual converter topologies of the first switched capacitor converter for converting the battery supply voltage into an intermediate voltage; a second switched capacitor converter comprising: an input for obtaining the intermediate voltage, and a second switch array comprising a second plurality of individually controllable semiconductor switches and a plurality of internal flying capacitors configurable to form one or more individual converter topologies of the second switched capacitor for converting the intermediate voltage into a DC output voltage; and a controller connected to respective control terminals of the first and second individually controllable semiconductor switches of the first and second switch arrays respectively.

Optionally, the controller is configured to select a converter topology of the first switched capacitor converter, and to select a converter topology of the second switched capacitor converter.

Optionally, the controller is configured to: determine, directly or indirectly, a charge state of the at least one external flying capacitor, compare the charge state to a predetermined charge criterion to obtain a comparison result, and recharge the at least one external flying capacitor via the first switch array based on the comparison result.

Optionally, the controller is configured to recharge the at least one external flying capacitor by toggling respective states of first and second pairs of the first plurality of individually controllable semiconductor switches of the first switch array to connect the least one external flying capacitor between the DC input of the first switched capacitor converter and the input of the second switched capacitor converter.

Optionally, the predetermined charge criterion for the at least one external flying capacitor comprises one or more of: a switching frequency of the second switched capacitor converter, a voltage difference between the DC output voltage and a set-point or target voltage of the DC output voltage, a voltage drop across the at least one external flying capacitor.

Optionally, the controller is configured to recharge the at least one external flying capacitor at a default or minimum switching frequency.

Optionally, the controller is configured to recharge the at least one external flying capacitor irrespective of a predetermined charge state to set a lower bound of a switching frequency of the first switched capacitor converter.

Optionally, the default or minimum switching frequency is higher than 16 kHz.

Optionally, a minimum switching frequency of the second switched capacitor converter is higher than 1 MHz.

Optionally, a maximum switching frequency of the first switched capacitor converter is below 250 kHz.

Optionally, the first plurality of the individually controllable semiconductor switches of the first switch array comprises: a first pair of individually controllable semiconductor switches driven by a first clock phase ($p_1$) of a clock signal, a second pair of individually controllable semiconductor switches driven by a second, and non-overlapping, clock phase ($p_2$) of the clock signal; the first pair of individually controllable semiconductor switches configured to charge the least one external flying capacitor from the battery supply voltage during the first clock phase, and the second pair of individually controllable semiconductor switches configured to discharge the least one external flying capacitor to the input of the second switched capacitor converter during the second clock phase.

Optionally, the integrated circuit switched capacitor DC-DC converter further includes a bypass circuit configured to allow the controller to bypass the second switched capacitor converter.

Optionally, the bypass circuit comprises a first controllable bypass switch (SWBP1) and a second controllable bypass switch (SWBP2), the bypass circuit configured to: in a first state, connect the at least one external flying capacitor between the DC input and the DC output voltage, and in a second state, connect the at least one external flying capacitor between a negative supply rail and the DC output voltage.

Optionally, the first controllable bypass switch (SWBP1) is configured to selectively connect and disconnect a first terminal of the at least one external flying capacitor and the DC output voltage in accordance with a first switch control signal supplied by the controller; and wherein the second controllable bypass switch (SWBP2) is configured to selectively connect and disconnect a second terminal of the at least one external flying capacitor and the DC output voltage in accordance with a second switch control signal supplied by the controller.

Optionally, the controller is configured to: generate a first switch control signal synchronously to the first clock phase ($p_1$) of the clock signal; and generate a second switch control signal synchronously to the second clock phase ($p_2$) of the clock signal.

Optionally, the second switched capacitor converter comprises an output voltage regulator, the output voltage regulator comprising: a reference voltage input for receipt of a first DC reference voltage and a feedback voltage input for receipt of a feedback voltage representative of the DC output voltage; and an error signal generator configured to combine the first DC reference voltage and the feedback voltage to determine a control signal; wherein the controller is configured to generate respective clock phases for the second plurality of individually controllable semiconductor switches of the second switch array to adjust the DC output voltage.

Optionally, the controller is configured to select the topology of the second switched capacitor converter such that an intrinsic energy efficiency of the second switched capacitor converter is maximum; the intrinsic energy efficiency being $\eta_1 = VCR/iVCR = Vo1/(Vint*iVCR)$; VCR=voltage conversion ratio of the selected converter topology; iVCR=desired voltage conversion ratio; Vint=the intermediate voltage.

Optionally, a total capacitance of the at least one external flying capacitor is larger than 500 nF.

Optionally, a total capacitance of the plurality of internal flying capacitors is smaller than 22 nF.

A head-wearable hearing device includes the integrated circuit switched capacitor DC-DC converter.

Optionally, the head-wearable hearing device further includes at least one rechargeable battery cell connectable to the DC input for supplying the battery supply voltage.

BRIEF DESCRIPTION OF THE DRAWINGS

Embodiments will be described in more detail in connection with the appended drawings, in which.

DETAILED DESCRIPTION

Figure 1:
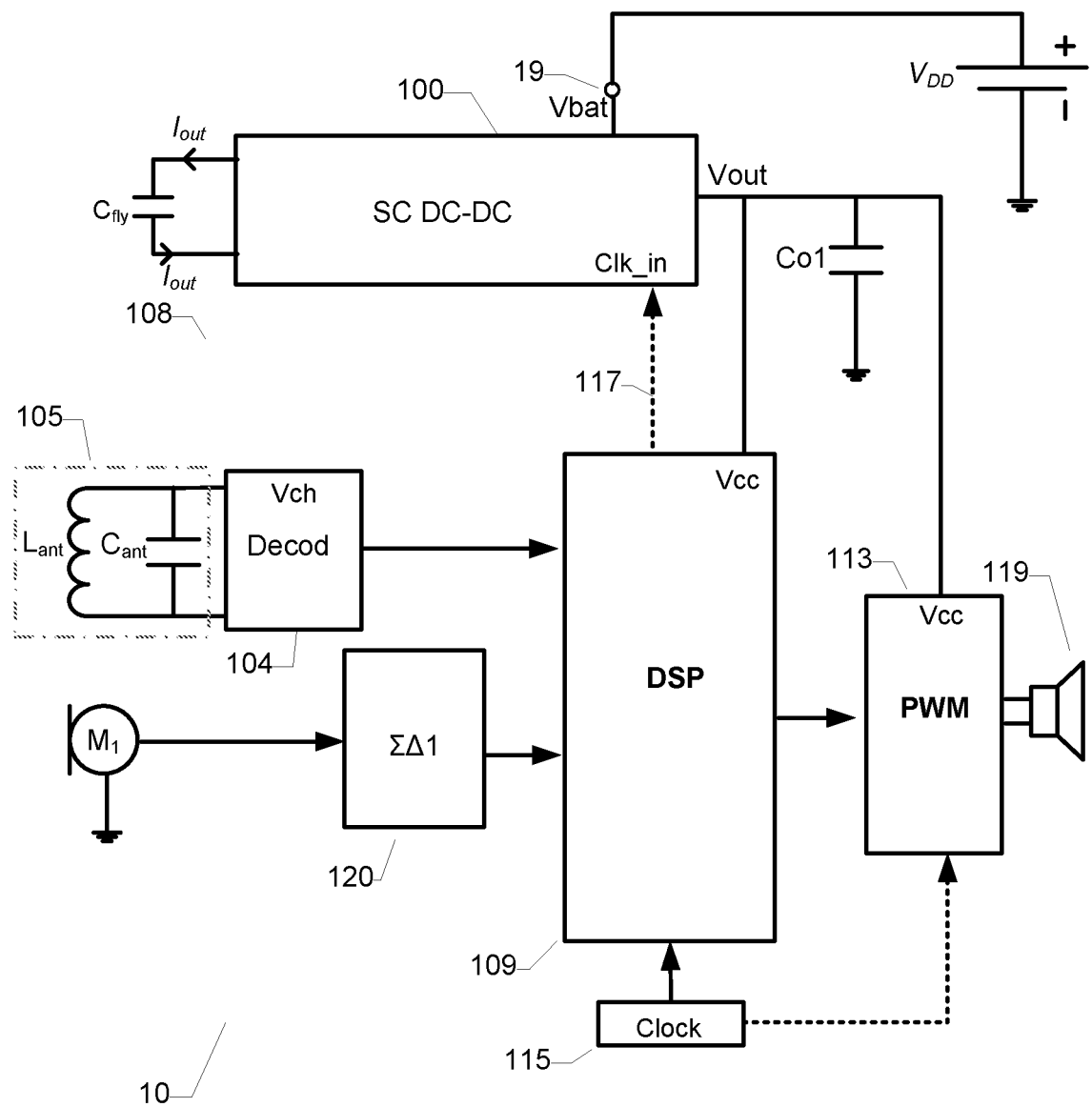
FIG. 1 shows a simplified schematic block diagram a head-wearable hearing device comprising an exemplary integrated circuit switched capacitor DC-DC converter according to any of the below-described embodiments thereof.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In the following various exemplary embodiments of the present switched capacitor DC-DC converter are described with reference to the appended drawings. The skilled person will understand that the appended drawings are schematic and simplified for clarity. Like reference numerals refer to like elements or components throughout. Like elements or components will therefore not necessarily be described in detail with respect to each figure. The skilled person will further appreciate that certain actions and/or steps may be described or depicted in a particular order of occurrence while those skilled in the art will understand that such specificity with respect to sequence is not actually required.

FIG. 1 shows a simplified schematic block diagram of an exemplary head-wearable hearing device 10 comprising an integrated circuit switched capacitor DC-DC converter 100 according to any of the below-described embodiments thereof. The DC input voltage input of the switched capacitor DC-DC converter 100 is connected to a rechargeable battery source $V_{DD}$. The rechargeable battery source is connected to the hearing device circuitry, including the integrally formed switched capacitor DC-DC converter 100, through a positive supply voltage terminal 19. The skilled person will understand that the battery source in other embodiments may comprise a non-rechargeable battery source where it is desired to step-up or step-down the nominal DC voltage level supplied by such non-rechargeable battery source to a different DC voltage level more optimal, e.g. lower power consumption, for active circuits or circuit blocks. The head-wearable hearing device 10 may comprise a hearing instrument or aid comprising various types of hearing aid housing styles such as Behind-the-Ear (BTE), In-the-Canal (ITC), Completely-in-Canal (CIC), RIC etc. The rechargeable battery source VDD may comprise at least one Li-Ion battery cell and may hence supply a nominal DC input voltage Vbat at around 4.0 V to the switched capacitor DC-DC converter 100. However, the battery discharge curve of Li-Ion battery cells lead to a large variation of the DC input voltage Vbat from about 4.2 Vat a fully charged state and down-to about 3.0 V at a discharged state and this places several implications for the design of the switched capacitor DC-DC converter 100 as discussed below. The head-wearable hearing device 10 comprises at least one microphone $M_1$ generating an audio signal in response to incoming sound at the device. The audio signal is amplified/buffered and digitized in an input channel comprising an optional microphone preamplifier (not shown) and the analog-to-digital converter 120 to provide a digital microphone signal to an appropriate input port or channel of a control and processing circuit 109 or processor. The head-wearable hearing device 10 may comprise a wireless transceiver 104 coupled to an antenna 105.

The processor 109 may comprise a software programmable DSP core and may apply one or more signal processing functions to the digital microphone signal under control of a set of executable program instructions or code. The one or more signal processing functions may be adapted to process the digital microphone signal as needed for example according to a hearing loss of a user where the head-wearable hearing device 10 comprises a hearing aid or hearing loss compensating functionality such that an appropriately compensated microphone signal is supplied to the user via the miniature loudspeaker 119. These signal processing functions may comprise different processing parameters of functions like non-linear amplification, noise reduction, frequency response shaping etc. The processor 109 is clocked by a master clock signal supplied by a master/system clock generator 115 and the clock frequency may lie above 2 MHz for example between 2 and 40 MHz. The master clock generator 115 may additionally supply synchronous clock signals to the analog-to-digital converter 120 and the class D output amplifier 113. As discussed above, the class D output amplifier 113 may convert the compensated microphone signal into a corresponding modulated output signal at a predetermined modulation frequency which is applied to the miniature receiver or loudspeaker 119 for production of sound pressure in the hearing instrument user's ear canal. The modulation frequency of the class D output amplifier may vary depending on the type of modulation scheme and performance requirement of the amplifier in a specific application. The class D output amplifier 113 may be configured to PWM or PDM modulate the output signal to the loudspeaker 119 with a modulation frequency between 250 kHz and 2 MHz.

The present embodiment of the switched capacitor DC-DC converter 100 is configured to step-down the applied DC input voltage in two separate steps by utilizing series connected first and second switched capacitor DC-DC converters (not shown) to generate the DC output voltage Vout as discussed in additional detail below. An output/smoothing capacitor Co1 is connected to the DC output voltage Vout of the switched capacitor DC-DC converter 100. The first switched capacitor DC-DC converter comprises an external flying capacitor $C_{fly}$ where the term external means external to an integrated circuit or semiconductor die or chip on which the remaining components of the switched capacitor DC-DC converter 100 are integrated, possibly together with other active circuit blocks of the head-wearable hearing device 10. These other active circuits may comprise the previously discussed analog-to-digital converter ΣΔ1 120, clock generator 115, a processor 109, RF wireless transceiver 104, class D audio output amplifier 113 etc.

The capacitance of the output/smoothing capacitor Co1 may be larger than 500 nF such as between 1 and 10 μF while the capacitance of the flying capacitor $C_{fly}$ may lie between 500 nF and 10 μF in a typical head-wearable hearing device 10.

If the rechargeable battery source $V_{DD}$ comprises Li-Ion battery cell(s), the switched capacitor DC-DC converter 100 may be designed to provide a nominal DC output voltage Vo1 between 1.5 V and 1.0 V such as about 1.2 V. The 1.2 V DC output voltage typically provides optimum or near-optimum power supply conditions for certain individual circuits or circuit blocks of the head-wearable hearing device 10 such as the class D audio output amplifier 113 or certain support circuit within the signal processor or DSP 109. The skilled person will appreciate that many circuit blocks, for example the class D audio output amplifier 113 and a flash memory or EEPROM memory (not shown) or sensor interface circuits (not shown), of the device 10 that are powered by the DC output voltage Vo1 may exhibit a highly variable current or power consumption over time for example with a relatively small power consumption for long time periods interrupted by occasional burst of relatively high power consumption. This time varying power consumption leads to certain challenges for traditional switched capacitor DC-DC converters as discussed below while a hybrid nature of the present switched capacitor DC-DC converter 100 is able to adapt to the varying power consumption needs of the load circuit(s) or consumers without sacrificing high conversion efficiency during normal or average power consumption as discussed in additional detail below.

Figure 2:
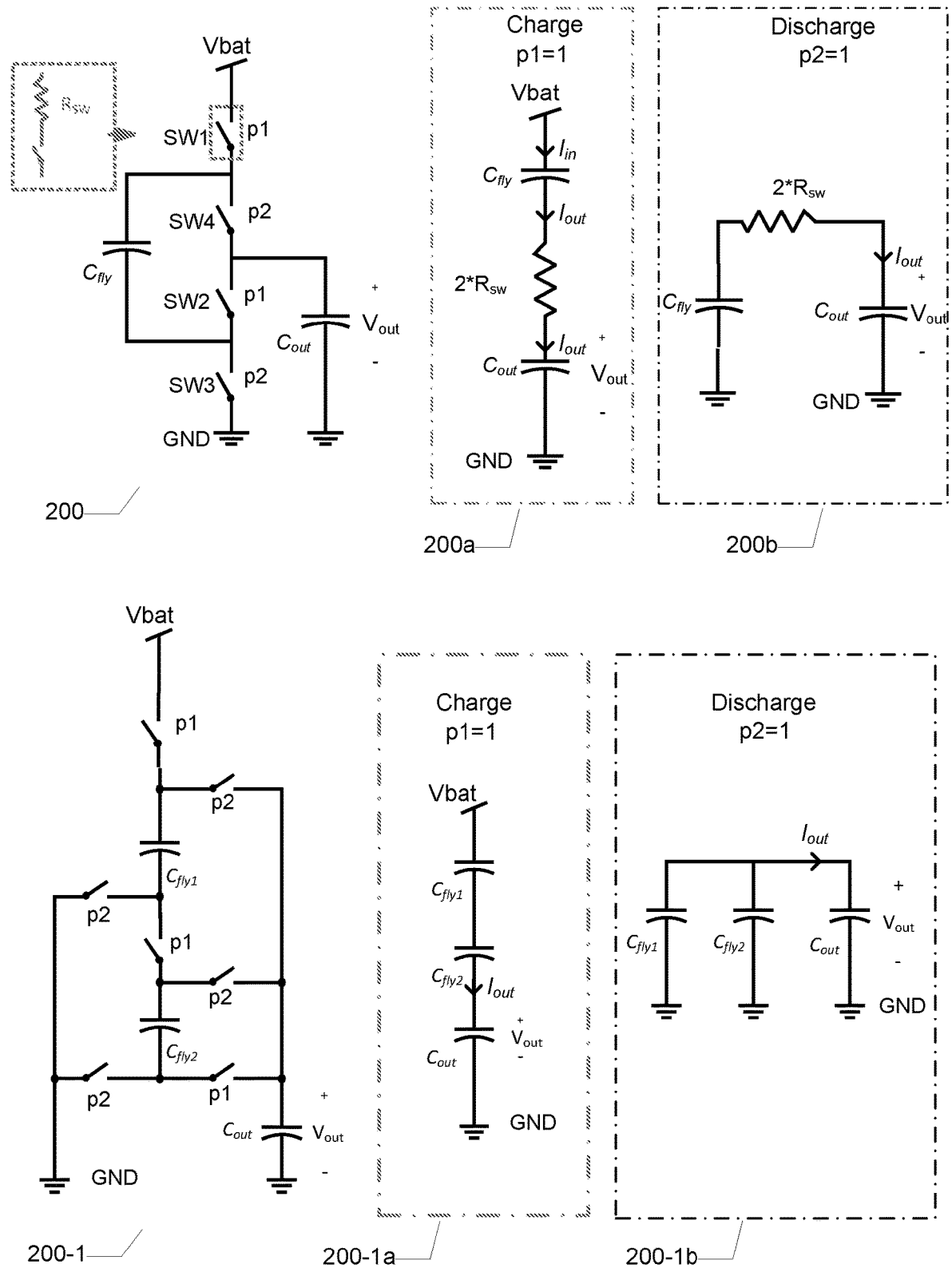
FIG. 2 shows first and second simplified schematic block diagrams of first and second switched capacitor DC-DC converter topologies.

The upper half of FIG. 2 shows a simplified schematic block diagram of a charge pump stage of a first switched capacitor DC-DC converter for illustrating a background solution. The switched capacitor DC-DC converter is a step-down 2:1 topology configured for converting a DC input voltage Vbat into a DC output voltage of approximately one-half of the DC input voltage. The charge pump circuit 200 comprises a flying capacitor $C_{fly}$, an output/smoothing capacitor $C_{out}$ and a switch array including a first controllable semiconductor switch SW1, a second controllable semiconductor switch SW2, a third controllable semiconductor switch SW3 and a fourth controllable semiconductor switch SW4. Switches SW1 and SW2 are driven by a first clock phase $\Phi_1$ of a clock signal and switches SW3 and SW4 are driven by a second clock phase $\Phi_2$ of the clock signal as schematically illustrated on the drawing. The first and second clock phases $\Phi_1$, $\Phi_2$ (alternatively designated p1, p2 on the drawings) of the clock signal are complementary and non-overlapping. The DC input voltage Vbat to the charge pump circuit 200 is applied to switch SW1 and the DC output voltage $V_{out}$ is delivered at output/smoothing capacitor $C_{out}$. A load of the charge pump circuit 200 is connected across the output/smoothing capacitor $C_{out}$ and the skilled person will understand the latter supplies energy power to the load when the flying capacitor $C_{fly}$ is charging from the DC input voltage. The skilled person will appreciate that each of the controllable semiconductor switches SW1, SW2, SW3 and SW4 may comprise a MOSFET, e.g. NMOS transistor, or a combination of MOSFETs, as the small size, large off-resistance and low on-resistance of MOSFET switches are advantageous properties in numerous applications of the charge pump circuit 200. In the present step-down topology of the charge pump circuit 200, SW1 is connected between the DC input voltage Vbat and a positive terminal of the flying capacitor SW4; SW2 is connected between a negative terminal of the flying capacitor SW4 and the DC output voltage. In an alternative 1:2 step-up embodiment, SW2 is connected between the negative terminal of the flying capacitor and a negative DC supply rail, such as GND. SW3 is connected between the negative terminal of the flying capacitor and the negative DC supply rail—e.g. GND. In the alternative 1:2 step-up embodiment, SW3 is connected between the negative terminal of the flying capacitor and the DC input voltage. SW4 is connected between the positive terminal of the flying capacitor and the DC output voltage. During operation of the charge pump circuit 200, the first and second switches SW1, SW2 are switched between respective on-states and off-states in accordance with the first clock phase $\Phi_1$ and the third and fourth switches SW3, SW4 are switched between respective on-states and off-states in accordance with the second clock phase $\Phi_2$. Hence, the switch array is configured to, in or during the first clock phase, charge the flying capacitor $C_{fly}$ from the DC input voltage Vbat through the on-resistances of SW1 and SW2. The combined on-resistance of SW1 and SW2 is schematically represented by resistor $2*R_{SW}$.

Furthermore, during the first clock phase, the switches SW3 and SW4 are off or non-conducting which lead to the equivalent schematic circuit diagram 200a. As illustrated, the flying capacitor $C_{fly}$ and output capacitor $C_{out}$ are effectively connected in series between the DC input voltage $V_{in}$ and GND such that the output voltage is charged to approximately one-half of the DC input voltage by periodically switching between the first and second clock phases in steady state operation when no load current is drawn from the output voltage of the charge pump circuit 200. The switch array is configured to, in or during the second clock phase $\Phi_2$, discharge the flying capacitor $C_{fly}$ into the output capacitor $C_{out}$ through a charge sharing mechanism due to the parallel connection of the flying capacitor and output capacitor through the conducting states of the switches SW3 and SW4. During the second clock phase, the switches SW1 and SW2 are off, i.e. or non-conducting, which leads to the equivalent schematic circuit diagram 200b. As illustrated, the flying capacitor $C_{fly}$ and output capacitor $C_{out}$ are effectively connected in parallel and disconnected from the DC input voltage Vbat. The skilled person will appreciate that each of the controllable semiconductor switches SW1, SW2, SW3 and SW4 may comprises a control terminal (not shown), e.g. a gate terminal for MOSFETs, to which the first or second clock phases $\Phi_1$, $\Phi_2$ are applied to selectively switch the controllable semiconductor switch in question between its on-state and off-state.

The lower half of FIG. 2 shows a simplified schematic block diagram of a charge pump stage 200-1 of a second switched capacitor DC-DC converter with supporting a plurality of converter topologies for illustrating a background solution. The present embodiment of the switched capacitor DC-DC converter may be configured to generate step-down conversion ratios of ⅓, ½ and ⅔ by appropriate adaptation of the converter topology. The present charge pump circuit 200-1 comprises, in contrast to the previously discussed pump circuit 200, two separate flying capacitors—a first flying capacitor $C_{fly1}$ and a second flying capacitor $C_{fly2}$ The charge pump circuit 200-1 comprises additionally an output/smoothing capacitor $C_{out}$ and a switch array including a total of seven controllable semiconductor switches controlled by respective clock phases of the first and second non-overlapping clock phases $\Phi_1$, $\Phi_2$ as illustrated. During operation of the charge pump circuit 200, the switch array is configured to, in or during the first clock phase, simultaneously charge the first flying capacitor $C_{fly1}$ and second flying capacitor $C_{fly2}$ from the DC input voltage $V_{in}$ through the on-resistances of active switches. Furthermore, during the first clock phase, the switches operated by the second clock phase $\Phi_2$ are off or non-conducting which leads to the equivalent schematic circuit diagram 200-1a. As illustrated, the first and second flying capacitors and the output capacitor $C_{out}$ are effectively connected in series between the DC input voltage Vbat and GND, or another negative supply rail, such that the output voltage is charged to approximately one-third of the DC input voltage in steady state operation of the pump circuit for the reasons discussed above in connection with the first charge pump circuit 200. The switch array is configured to, during the second clock phase $\Phi_2$, discharge the first and second flying capacitors into the output capacitor $C_{out}$ through a charge sharing mechanism caused by the parallel connection of the first and second flying capacitors and output capacitor through the respective on-resistances of the active/conducting switches. During the second clock phase, the switches operated by the first clock phase $\Phi_1$ are off or non-conducting while the switches operated by the second clock phase $\Phi_2$ are on or conducting which lead to the equivalent schematic circuit diagram 200-1b of the charge pump circuit 200-1. As illustrated, the first and second flying capacitors $C_{fly1}$ and $C_{fly2}$ and the output capacitor $C_{out}$ are effectively connected in parallel and disconnected from the DC input voltage Vbat.

Figure 3:
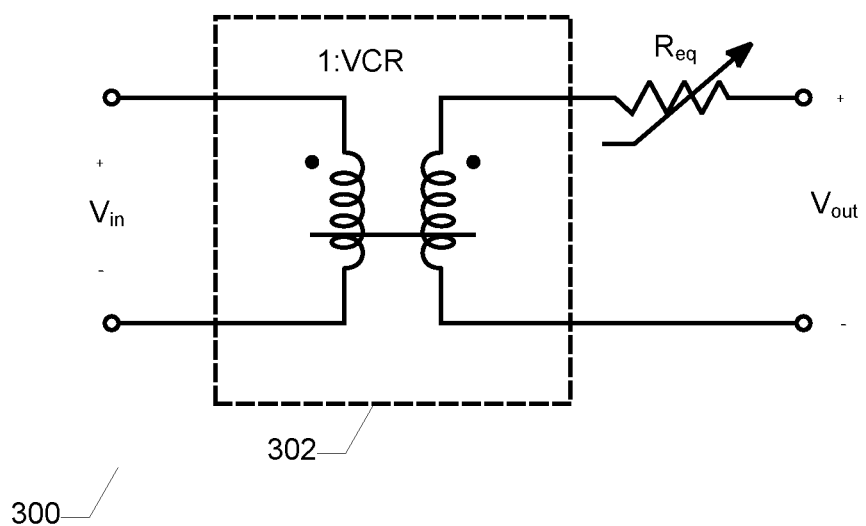
FIG. 3 shows a generally applicable electrical model of a switched capacitor DC-DC converter.

FIG. 3 is a generally applicable model 300 of a switched capacitor DC-DC converter which model is discussed below to highlight the background of some of the advantageous properties of integrated circuit switched capacitor DC-DC converter in accordance with some embodiments. The DC input voltage $V_{in}$ feeds input power or energy to switched capacitor DC-DC converter and during operation the latter generates the DC output voltage Vout which may be higher or lower than the DC input voltage depending on the topology of the switched capacitor DC-DC converter as discussed above. Generally, switched capacitor DC-DC converter efficiencies suffer by both intrinsic energy losses which are due to the linear loss when the SC DC-DC converter is operated with a voltage conversion ratio (VCR) deviating from the so-called ideal voltage conversion ratio, iVCR, and some "extrinsic losses" due to e.g. parasitic capacitances at nodes of the output stage, gate capacitances of the semiconductor switches etc. The on-resistance of the latter switches leads to intrinsic power losses in the switched capacitor DC-DC converter because excess power of regulating the DC output voltage to a level below Vbat*iVCR is dissipated in these on-resistances.

Experience shows that the intrinsic energy losses typically are dominating in switched capacitor DC-DC converter designs using external flying capacitors because the ratio of useful capacitance to parasitic capacitance is very large for such external flying capacitors. The intrinsic and extrinsic loss mechanisms of a switched capacitor DC-DC converter is illustrated by the model 300 of FIG. 3 comprising an ideal transformer 302 with a variable winding ratio as set by the actual VCR (i.e. $V_{out}/V_{in}$) and an equivalent loss resistance $R_{eq}$ connected in series with a secondary winding of the transformer 302. The loss resistance $R_{eq}$ comprises two separate resistance components:

1) a first resistance component representing an equivalent output resistance associated with switching of the one or more flying capacitors at the clock frequency of the clock signal driving the first and second clock phases. The skilled person will understand that this equivalent output resistance is inversely proportional to the clock frequency such that increasing clock frequency leads to decreasing equivalent output resistance; and
2) a second resistance component representing the combined on-resistance of the active semiconductor switches in any particular clock phase, e.g. on-resistances of the switches SW1 and SW2 in the first clock phase $\Phi_1$ of the previously discussed exemplary 2:1 step-down charge pump circuit 200.

A switched capacitor DC-DC converter is particularly energy or power efficient when the DC input voltage and the DC output voltage are related by one of the ideal voltage conversion ratio iVCR(s) associated with the selected topology of the SC DC-DC converter such as ⅓ or ½ or ⅔ or 2, or 3 or 5 etc. By increasing the number of flying capacitors a growing number of possible converter topologies and associated iVCRs may be selected as illustrated by Table 1 below illustrating the rapid growth of iVCRs with n for a step-down type switched capacitor DC-DC converter:

TABLE 1

| Number of $C_{fly}$, n | N(n) |
| --- | --- |
| 1 | $\frac{1}{2}$ $\frac{1}{1}$ |
| 2 | $\frac{1}{3}$ $\frac{1}{2}$ $\frac{2}{3}$ $\frac{1}{1}$ |
| 3 | $\frac{1}{5}$ $\frac{1}{4}$ $\frac{1}{3}$ $\frac{2}{5}$ $\frac{1}{2}$ $\frac{3}{5}$ $\frac{2}{3}$ $\frac{3}{4}$ $\frac{4}{5}$ $\frac{1}{1}$ |

As discussed above, the so-called intrinsic energy loss of the switched capacitor DC-DC converter is minimized, or equivalently the intrinsic energy efficiency is maximized, when the converter is operated at one of the iVCRs. Hence, it would seem desirable to include a large number of flying capacitors in a switched capacitor DC-DC converter design to enable multiple converter topologies or gears if the DC input voltage varies widely and/or the target DC output voltage varies widely. The large number of converter topologies makes it possible to select a particular converter topology, e.g. ⅕ or ⅔, which possesses an iVCR close to any desired operating point, in terms of DC input voltage and DC output voltage, of the SC converter. This ensures a high intrinsic energy efficiency of the switched capacitor DC-DC converter. However, a large number of external capacitors are generally undesirable due to increasing carrier footprint, increasing manufacturing costs etc. of the switched capacitor DC-DC converter. These disadvantages are particularly pronounced for compact wearable devices like hearing instruments and headsets that are severely space constrained.

Figure 4:
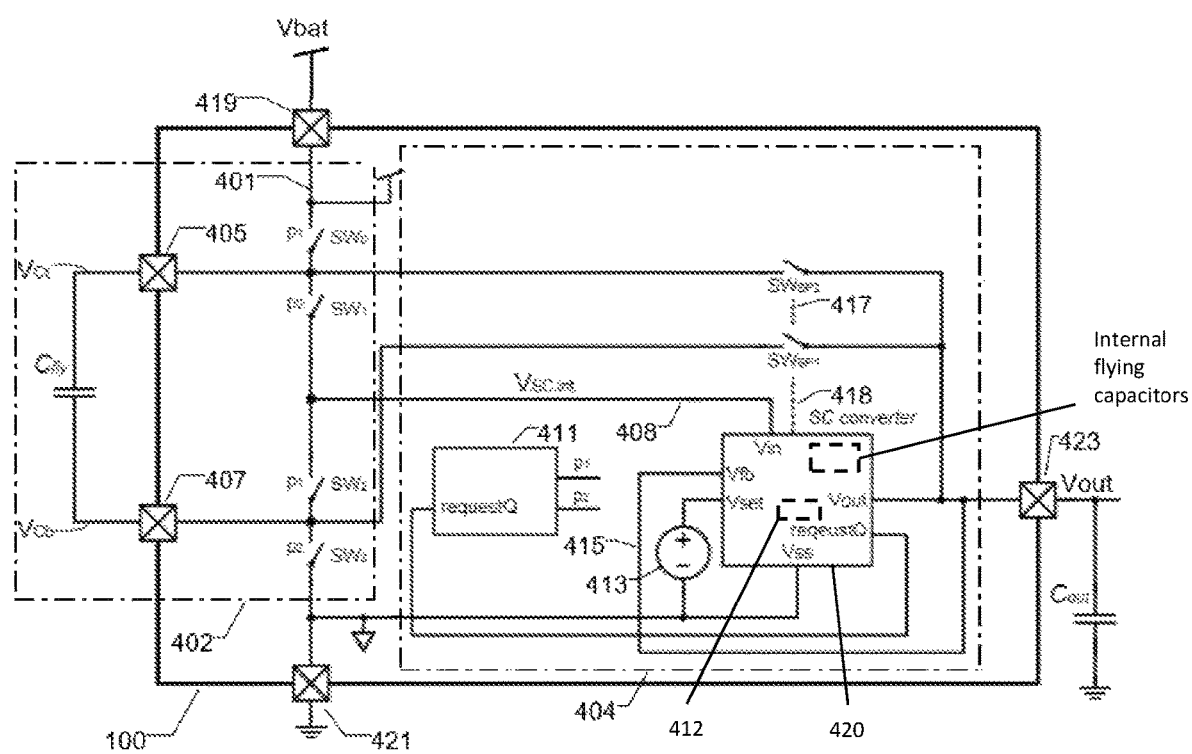
FIG. 4 is simplified schematic block diagram the exemplary integrated circuit switched capacitor DC-DC converter according to embodiments.

FIG. 4 shows simplified schematic block of the previously discussed exemplary integrated circuit switched capacitor DC-DC converter 100 in accordance with some embodiments. The integrated circuit switched capacitor DC-DC converter 100 comprises a first switched capacitor converter 402 and a second switched capacitor converter 404. The first switched capacitor converter 402 comprises a DC input 401 for receipt of a battery supply voltage Vbat. The battery supply voltage Vbat is provided to the DC input 401 through an externally accessible pad or terminal of an semiconductor die or chip holding the integrated circuit 100. The first switched capacitor converter 402 comprises a first switch array comprising a plurality of individually controllable semiconductor switches SW0, SW1, SW2 and SW3 that are connectable to an external flying capacitor Cfly. The external flying capacitor Cfly is coupled to the first switch array through a pair of externally accessible pads or terminals 405, 407 of the integrated circuit 100. The skilled person will understand that the illustrated switched capacitor DC-DC converter which merely comprises a single flying capacitor may be configured as 1:1 converter topology, 2:1 converter topology or a 1:2 converter topology by appropriate switch array control. However, other embodiments of the first switched capacitor converter 402 may comprise one or more additional external flying capacitor(s) and configured to provide additional converter topologies such as step-down conversion ratios of ⅓ and ⅔ by appropriate adaptation of the converter topology. During operation the first switched capacitor converter 402 generates an output voltage Vsc, int using the previously discussed operating mechanisms. This output voltage Vsc, int can be viewed as an intermediate voltage of the switched capacitor DC-DC converter 100 since this intermediate voltage in some embodiments may be unconnected to any pad or terminal of the semiconductor die or chip, i.e. not externally accessible. The latter embodiment of the switched capacitor DC-DC converter 100 therefore operates without any off-chip smoothing capacitor coupled to the intermediate voltage Vsc, int leading to a beneficial reduction of external components and chip area.

However, the output voltage Vsc,int is coupled to an input Vin of the second switched capacitor converter 404 via wire or trace 408. The second switched capacitor converter 404 therefore converts the output voltage Vsc, int supplied by the first switched capacitor converter 402 into the DC output voltage Vout of the switched capacitor DC-DC converter 100. A smoothing capacitor $C_{out}$ is connected to the output voltage Vout of the switched capacitor DC-DC converter 100. This is preferably an external capacitor as indicated connected to the output of the second switched capacitor converter 404 via a terminal or pad 423 of the semiconductor die. The skilled person will understand that the first and second switched capacitor converters 402, 404 are series connected between the DC input 401 and the DC output voltage Vout. The second switched capacitor converter 404 comprises a second switch array which may comprise a plurality of individually controllable semiconductor switches, e.g. including an output stage of the converter 404 (not shown) and a plurality of internal flying capacitors (not shown) e.g. three, four, five or even more internal flying capacitors using the mechanisms and switch array designs discussed previously in connection with FIG. 2. The plurality of internal flying capacitors are therefore integrated on the semiconductor die, i.e. chip, which severely limits the maximum capacitance of each of the flying capacitors due to the relatively low capacitance per area or capacitance density available on semiconductor dies and the generally high costs of die area. The plurality of internal flying capacitors, output stage and part of the controller of the second converter 404 are arranged inside a schematically illustrated circuit block 420 which interfaces to the residual portion of the integrated circuit switched capacitor DC-DC converter 100 via terminals Vin, Vfb, Vset, Vout, requestQ and Vss.

The switched capacitor DC-DC converter 100 additionally comprises the previously discussed controller (not shown). This controller may be distributed over several control sections or circuits for example a first control section 411 and a second control section 412 arranged within circuit block 420 of the second switched capacitor converter 404. The controller may comprise a suitably configured digital state machine or a software programmable microprocessor. The controller is connected to the respective controllable semiconductor switches of the first and second switch arrays and capable of changing the respective topologies of the first and second switched capacitor converters. The controller may in certain embodiments be configured or programmed to select the topology of the second switched capacitor converter 404 to maximize its intrinsic energy efficiency at the set-point of the DC output voltage Vout.

The intrinsic energy efficiency being $\eta_1$=VCR/iVCR=Vo1/(Vint*iVCR);

$\eta_1$=Intrinsic energy efficiency of the second switched capacitor converter at the set-point voltage of the DC output voltage;

VCR=Voltage conversion ratio of selected converter topology:

iVCR=ideal voltage conversion ratio of the second switched capacitor converter

Vsc, int=the intermediate voltage at the input of the second switched capacitor converter.

The integrated circuit switched capacitor DC-DC converter 100 preferably comprises a clock generator (not shown) which generates a clock signal and derives a pair of non-overlapping clock phases therefrom for controlling state switching of the four individually controllable semiconductor switches of the first switch array of the first switched capacitor converter 402. The same pair of non-overlapping clock phases may control state switching of the plurality of individually controllable semiconductor switches of the second switch array of the second switched capacitor converter 404. The first control section 411 is configured to apply the pair of clock phases $p_1$, $p_2$ to the individually controllable semiconductor switches of the first switch array allowing the first control section 411 to control the timing of the non-overlapping clock phases $p_1$, $p_2$. In this manner, the first switched capacitor converter 402 can operate as a passive slave to the first control section 411 exclusively recharging the flying capacitor $C_{fly}$ on request from the first control section 411. More specifically, during a discharge state, or discharge phase, of the first switch array of the first switched capacitor converter 402, the semiconductor switches SW1 and SW3 are switched to on or conducting states by the first control section 411 via the non-overlapping clock phases $p_1$, $p_2$ while the semiconductor switches SW0 and SW2 are switch to off or non-conducting states. This discharge state connects the flying capacitor $C_{fly}$ in parallel to the DC input Vin of the second switched capacitor converter 404 and therefore delivers energy or charge from $C_{fly}$ to the second switched capacitor converter 404 such that $C_{fly}$ is gradually depleted or discharged.

In contrast, during a charging state, or charge phase, of the first switch array of the first switched capacitor converter 402 the states of the individually controllable semiconductor switches of the first switch array have been toggled on request from the controller via control section 411 such that semiconductor switches SW0 and SW2 are conducting while the semiconductor switches SW1 and SW3 are off or non-conducting. In this manner, the flying capacitor $C_{fly}$ is now connected between the DC input voltage 401 and the DC input Vin of the second switched capacitor converter 404 via the semiconductor switches SW0 and SW2. Hence, recharging the flying capacitor $C_{fly}$ and charging the DC input Vin of the second switched capacitor converter 404. This charging state of the first switch array of the first switched capacitor converter 402 may continue until the intermediate voltage to the second switched capacitor converter 404 is discharged again and the first switch array in response switched or toggled back to the discharge state where the now recharged flying capacitor $C_{fly}$ supplies energy to the of the second switched capacitor converter 404. The skilled person will understand that during charging of $C_{fly}$ the intermediate voltage Vsc, int is falling. Accordingly, the first switch array may be toggled or switched between charge and discharge states by the controller in response to Vsc, int complies with a predetermined charge criterion—for example falls below a certain threshold voltage. The predetermined charge criterion, e.g. threshold voltage, may for example represent a charge level where the integrated circuit switched capacitor DC-DC converter 100 is unable to maintain the DC output voltage at the target or desired output voltage. Consequently, the first switched capacitor converter 402 can be operated at very high energy efficiency because this converter 402 may be configured to only switch or toggle state when the flying capacitor $C_{fly}$ has been discharged to a critical state. The charge state of the flying capacitor $C_{fly}$ may be determined by the controller in a direct manner or in indirect manner. The controller may be configured to determine the charge state of the flying capacitor $C_{fly}$ indirectly by monitoring a switching frequency, or equivalently an output resistance of the second switched capacitor converter 404. When the switching frequency of the second switched capacitor converter 404 reaches its maximum switching frequency this condition may indicate that the charge on the flying capacitor $C_{fly}$ is depleted.

Hence, in response the controller issues a recharge command to the first switched capacitor converter 402 via the output port "requestQ" of the second switched capacitor converter 404. This recharge command is conveyed through the first control section 411 to the individually controllable semiconductor switches SW0, SW1, SW2 and SW3 of the first switch array leading to the previously discussed state switching of the first switch array. The skilled person will understand that this embodiment is particularly suited where the second switched capacitor converter 404 comprises an output voltage regulator utilizing switching frequency control of the DC output voltage Vout.

An alternative embodiment of the controller may be configured to determine the charge state of the flying capacitor $C_{fly}$ indirectly by monitoring a voltage difference between the DC output voltage Vout and a set-point or target voltage Vset of the DC output voltage.

The second switched capacitor converter 404 preferably comprises an output voltage regulator which is configured to maintain the DC output voltage at a DC reference voltage or set-point voltage such as a DC output voltage between 0.6 V and 1.4 V. A reference voltage generator 413 is configured supply the set-point voltage to a reference voltage input Vset of the controller. The voltage regulator additionally comprises a feedback voltage input Vfb that is connected to the DC output voltage Vout. The voltage regulator additionally comprises an error signal generator (not shown) configured to subtract the DC reference voltage Vset and the feedback voltage at the Vfb input to determine a control signal, e.g. error signal, for the controller representing a difference between a current DC output voltage and the set-point voltage. According to this embodiment, the controller may be configured to control the requestQ signal via a second error signal representing Vout−Vset−Vdelta, where Vdelta is a voltage significantly smaller than Vset, e.g. less than one-tenth e.g. below 20 mV. When this second error signal becomes negative it indicates that Vout has dropped below Vset−Vdelta which is likely due to the second switched capacitor converter 404 is unable to deliver sufficient current to the load at existing voltage level of Vsc, int. The controller may therefore issue the requestQ signal in response Vout−Vset−Vdelta becomes >0.

The controller may use various well-known control mechanisms to adjust the DC output voltage such as pulse width control, single boundary control, pulse frequency control, pulse skipping control etc. This may be achieved by appropriate control of the timing of respective clock phases of the plurality of individually controllable semiconductor switches of each of the first switch array and second switch array.

In the case of pulse skipping control the toggling of the charging state of the first switched capacitor power converter 402 may be carried out in response to a "shooting frequency" or time separation between individual pulses generated by the controller exceeds a certain threshold. The detection of the condition of high shooting frequency could be implemented by detecting if the controller issues more than a certain number of pulses within a certain time frame. This detection may be implemented by a digital counter in combination with a divided clock signal derived from the main clock signal for defining the pulse counting time frame.

When using a single boundary toggling controller, which may be viewed as a type of frequency modulation control, phase transitions of the output stage of the first switched capacitor power converter 402, e.g. either p1 to p2 or p2 to p1, is issued when the DC output voltage Vout drops below the set-point voltage. The comparison may be carried out by a dynamically clocked comparator such that a toggle signal is issued as long as the output voltage is below the set-point voltage. If the number of toggles in a certain time frame exceeds a predefined number, the controller issues the requestQ signal to cause a charging state switch or toggle in the first switched capacitor converter 402.

The integrated circuit switched capacitor DC-DC converter 100 comprises an optional bypass circuit which allows the controller to bypass the second switched capacitor converter 404 under certain operating conditions. This bypass circuit comprises a first controllable bypass switch $SW_{BP1}$ and a second controllable bypass switch $SW_{BP2}$. This bypass circuit allows the integrated circuit switched capacitor DC-DC converter 100 to switch from a normal mode of operation as described above, where the output of the first switched capacitor converter 402 essentially charges the input of the second switched capacitor converter 404, to a "high-power" mode where the output of the first switched capacitor converter 402 essentially charges the DC output voltage and output capacitor. The high-power mode enables the switched capacitor DC-DC converter 100 to deliver a large load power bursts without compromising the energy conversion efficiency at normal or ordinary load power levels. This is accomplished by connecting the first switch array SW0, SW1, SW2 and SW3 directly to the output voltage Vout and output capacitor $C_{out}$ through the first and controllable bypass switches $SW_{BP1}$ and $SW_{BP2}$.

The controller of the switched capacitor DC-DC converter 100 may be configured to select the normal mode of operation when the load current supplied at Vout is smaller than a certain current or power threshold or limit e.g. 1 mW, 5.0 mA or 1.0 mA etc. The second switched capacitor converter 404 is capable of supplying such small load power levels at a high efficiency for the reasons discussed previously. However, if the load power level jumps to a level above the power threshold or limit, the second switched capacitor converter 404 may be unable to deliver the required power and accommodate this power burst for the reasons discussed previously. The controller detects that the power burst exceeds the power threshold and in response activates the bypass circuit to switch the switched capacitor DC-DC converter 100 to the high-power mode. The output resistance or impedance of the first switched capacitor converter 402 is smaller than the output resistance of the second switched capacitor converter 404 due to inter alia the much larger capacitance of the external flying capacitor $C_{fly}$ than the combined capacitance of the plurality of internal, or integrated, flying capacitors of the second switched capacitor converter 404. The capacitance of the external flying capacitor $C_{fly}$ may be larger than 500 nF or larger than 1 μF and the combined capacitance of the plurality of internal, or integrated, flying capacitors smaller than 50 nF. The controller may control the respective state switching of the first and controllable bypass switches $SW_{BP1}$ and $SW_{BP2}$ via a suitable port or connection 417, 418 to respective control terminals of the first and second controllable bypass switches $SW_{BP1}$ and $SW_{BP2}$. The control or drive signal of the first bypass switch $SW_{BP1}$ is preferably synchronous with the first clock phase $p_1$ and the control or drive signal of the second bypass switch $SW_{BP2}$ is preferably synchronous with the second clock phase $p_2$.

Hence, the first and second bypass switches $SW_{BP1}$ and $SW_{BP2}$ are operated in a non-overlapping scheme and in opposite phase by their respective control signals. During the first clock phase $p_1$, the first and third semiconductor switches SW0 and SW2 of the first switch array and first bypass switches $SW_{BP1}$ are all conducting/on. Consequently, the external flying capacitor $C_{fly}$ is connected between the DC input 401 and the DC output voltage Vout such that $C_{fly}$ and $C_{out}$ are coupled in series to the DC input 401 and battery voltage Vbat. The first terminal Vct of the external flying capacitor $C_{fly}$ is connected to the DC input 401 through Sw0 and the second terminal Vcb of $C_{fly}$ is connected to Vout through $SW_{BP1}$.

During the second clock phase $p_2$, the second and fourth semiconductor switches SW1 and SW4 of the first switch array and second bypass switches $SW_{BP2}$ are all conducting/on while SW0, SW2 and $SW_{BP1}$ are off. Consequently, the external flying capacitor $C_{fly}$ is connected between a negative supply rail, e.g. ground or a negative DC supply voltage relative to Vbat, and the DC output voltage such that the second switched capacitor converter 404 effectively is bypassed because $C_{fly}$ is coupled in parallel to the output capacitor $C_{out}$ and charge therein directly discharged to the output capacitor $C_{out}$.

Each of the first and second controllable bypass switches $SW_{BP1}$ and $SW_{BP2}$ may include one or several semiconductor switches such as a MOSFET device(s). Each of the first and second controllable bypass switches $SW_{BP1}$ and $SW_{BP2}$ may comprise multiple switch segments coupled in parallel and individually controllable by controller. The controller may be configured to turn-on only the number of switch segments necessary to support the current load on Vout.

The skilled person will appreciate that the intrinsic energy efficiency of the first switched capacitor converter 402 may be less-than ideal during the high-power mode, due to a limited number of available converter topologies, e.g. only 1:1 and 2:1 step-down based on a single flying capacitor. However, this lower intrinsic energy efficiency may have merely marginal impact on the total energy consumption if the duration of the power consumption bursts is small compared to the time periods of normal or ordinary load power levels. During the latter time periods, the second switched capacitor converter 404 supplies the load power at very high intrinsic energy efficiency.

Figure 5:
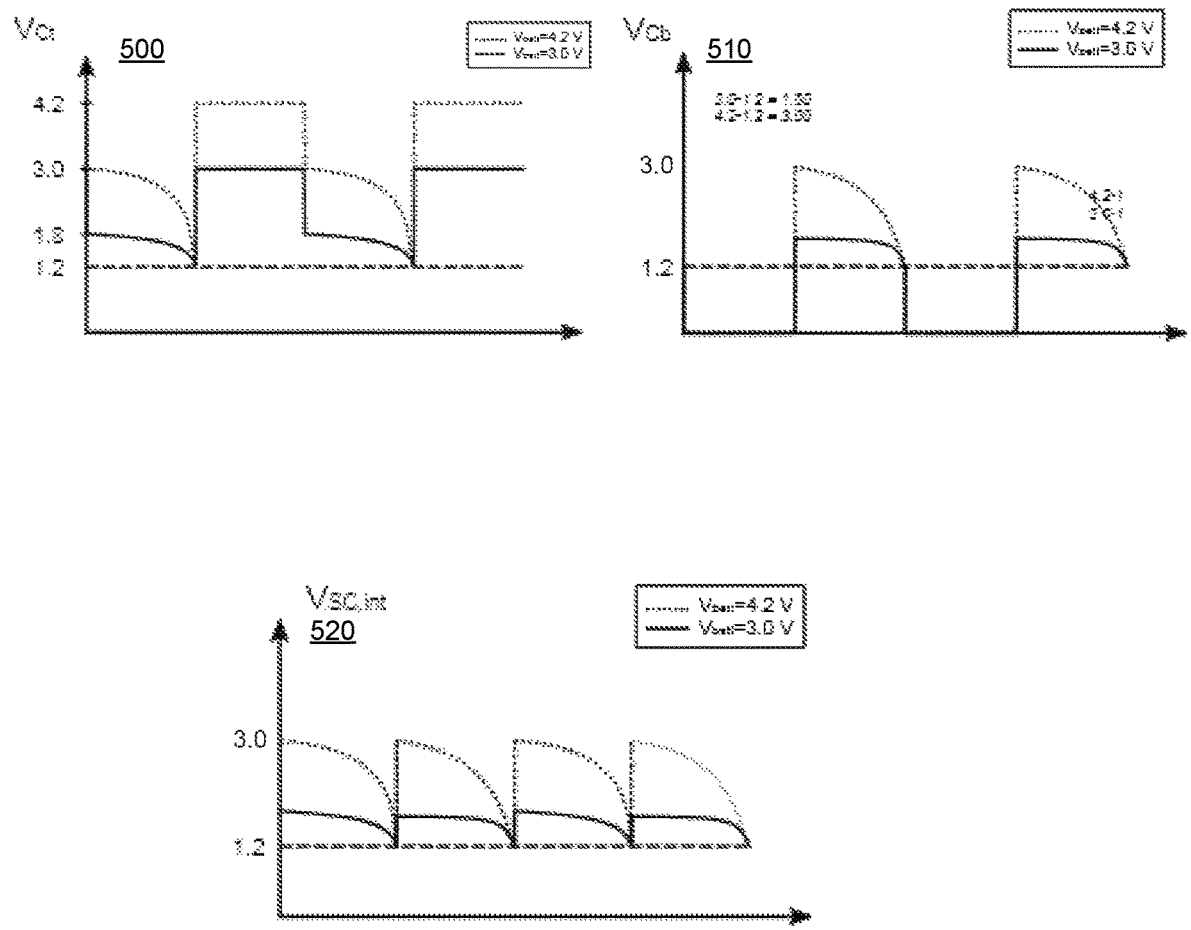
FIG. 5 shows various voltage waveforms at internal circuit nodes of the exemplary integrated circuit switched capacitor DC-DC converter during operation.

FIG. 5 shows various plots of voltage waveforms at internal circuit nodes of the exemplary integrated circuit switched capacitor DC-DC converter 100 during operation. The DC output voltage Vout is set to 1.2 V. Plot 500 shows the voltage at the first terminal Vct of the external flying capacitor $C_{fly}$ at battery voltages Vbat of 4.2V (dotted line) and 3.0 V (full line). As expected Vct alternates between the battery voltage Vbat and Vout in accordance with the non-overlapping clock phases $p_1$, $p_2$. The plot 510 shows the corresponding voltage at the second terminal Vcb of the external flying capacitor $C_{fly}$ at battery voltages Vbat of 4.2V (dotted line) and 3.0 V (full line). Vcb alternates between (Vbat minus Vout) and gnd (zero volts) in accordance with the non-overlapping clock phases $p_1$, $p_2$. The skilled person will appreciate that at least some of the controllable semiconductor switches SW1, SW2, SW3 and SW4 of the first switch array of the first converter 402 are subjected to voltage levels corresponding to Vbat. This means that at least some of these controllable semiconductor switches must be so-called high voltage devices in state-of-art CMOS semiconductor processes to be able to withstand the maximum battery voltage level, e.g. 4.2 V, without break-down or other damage. On the other hand, the plot 520 shows the corresponding intermediate voltage Vsc, int, which is the input voltage Vin of the second switched capacitor converter 404, at battery voltages Vbat of 4.2V (dotted line) and 3.0 V (full line). As shown, the intermediate voltage Vsc, int Vcb alternates between (Vbat minus Vout) and Vout in accordance with the non-overlapping clock phases $p_1$, $p_2$. Consequently, the controllable semiconductor switches of the second switch array of the second converter 404 are subjected to voltage levels well-below Vbat. The first converter 402 shields the second converter 404 to the full Vbat voltage level. This means that the controllable semiconductor switches of the second converter 404 may be implemented as standard low-voltage semiconductor transistors which exhibit a smaller parasitic capacitance and smaller area than the high-voltage semiconductor transistors and therefore improving the energy efficiency of the second converter 404.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. An integrated circuit switched capacitor DC-DC converter comprising:
a first switched capacitor converter comprising:
a DC input for receipt of a battery supply voltage, and
a first switch array comprising a first plurality of individually controllable semiconductor switches connectable to at least one external flying capacitor to form one or more individual converter topologies of the first switched capacitor converter for converting the battery supply voltage into an intermediate voltage;
a second switched capacitor converter comprising:
an input for obtaining the intermediate voltage, and
a second switch array comprising a second plurality of individually controllable semiconductor switches and a plurality of internal flying capacitors configurable to form one or more individual converter topologies of the second switched capacitor for converting the intermediate voltage into a DC output voltage;
wherein the integrated circuit switched capacitor DC-DC converter also comprises a controller connected to respective control terminals of the first and second individually controllable semiconductor switches of the first and second switch arrays respectively; and
wherein a maximum switching frequency of the first switched capacitor converter is below 250 kHz.

2. The integrated circuit switched capacitor DC-DC converter according to claim 1, wherein the controller is configured to determine a converter topology of the first switched capacitor converter, and to determine a converter topology of the second switched capacitor converter.

3. The integrated circuit switched capacitor DC-DC converter according to claim 1, wherein the controller is configured to:
determine, directly or indirectly, a charge state of the at least one external flying capacitor,
compare the charge state to a predetermined charge criterion to obtain a comparison result, and
recharge the at least one external flying capacitor via the first switch array based on the comparison result.

4. The integrated circuit switched capacitor DC-DC converter according to claim 3, wherein the controller is configured to recharge the at least one external flying capacitor by toggling respective states of first and second pairs of the first plurality of individually controllable semiconductor switches of the first switch array to connect the least one external flying capacitor between the DC input of the first switched capacitor converter and the input of the second switched capacitor converter.

5. The integrated circuit switched capacitor DC-DC converter according to claim 3, wherein the predetermined charge criterion for the at least one external flying capacitor comprises one or more of:
   a switching frequency of the second switched capacitor converter,
   a voltage difference between the DC output voltage and a set-point or target voltage of the DC output voltage,
   a voltage drop across the at least one external flying capacitor.

6. The integrated circuit switched capacitor DC-DC converter according to claim 3, wherein the controller is configured to recharge the at least one external flying capacitor at a default or minimum switching frequency.

7. The integrated circuit switched capacitor DC-DC converter according to claim 1, wherein the controller is configured to recharge the at least one external flying capacitor irrespective of a predetermined charge state to set a lower bound of a switching frequency of the first switched capacitor converter.

8. The integrated circuit switched capacitor DC-DC converter according to claim 6, wherein the default or minimum switching frequency is higher than 16 kHz.

9. The integrated circuit switched capacitor DC-DC converter according to claim 1, wherein a minimum switching frequency of the second switched capacitor converter is higher than 1 MHz.

10. The integrated circuit switched capacitor DC-DC converter according to claim 1, wherein the first plurality of the individually controllable semiconductor switches of the first switch array comprises:
    a first pair of individually controllable semiconductor switches driven by a first clock phase ($p_1$) of a clock signal,
    a second pair of individually controllable semiconductor switches driven by a second, and non-overlapping, clock phase ($p_2$) of the clock signal;
    the first pair of individually controllable semiconductor switches configured to charge the least one external flying capacitor from the battery supply voltage during the first clock phase, and the second pair of individually controllable semiconductor switches configured to discharge the least one external flying capacitor to the input of the second switched capacitor converter during the second clock phase.

11. The integrated circuit switched capacitor DC-DC converter according to claim 1, further comprising a bypass circuit configured to allow the controller to bypass the second switched capacitor converter.

12. The integrated circuit switched capacitor DC-DC converter according to claim 11, wherein the bypass circuit comprises a first controllable bypass switch (SWBP1) and a second controllable bypass switch (SWBP2), the bypass circuit configured to:
    in a first state, connect the at least one external flying capacitor between the DC input and the DC output voltage, and
    in a second state, connect the at least one external flying capacitor between a negative supply rail and the DC output voltage.

13. The integrated circuit switched capacitor DC-DC converter according to claim 12, wherein the first controllable bypass switch (SWBP1) is configured to selectively connect and disconnect a first terminal of the at least one external flying capacitor and the DC output voltage in accordance with a first switch control signal supplied by the controller; and
   wherein the second controllable bypass switch (SWBP2) is configured to selectively connect and disconnect a second terminal of the at least one external flying capacitor and the DC output voltage in accordance with a second switch control signal supplied by the controller.

14. The integrated circuit switched capacitor DC-DC converter according to claim 10, wherein the controller is configured to:
   generate a first switch control signal synchronously to the first clock phase ($p_1$) of the clock signal; and
   generate a second switch control signal synchronously to the second clock phase ($p_2$) of the clock signal.

15. An integrated circuit switched capacitor DC-DC converter comprising:
   a first switched capacitor converter comprising:
      a DC input for receipt of a battery supply voltage, and
      a first switch array comprising a first plurality of individually controllable semiconductor switches connectable to at least one external flying capacitor to form one or more individual converter topologies of the first switched capacitor converter for converting the battery supply voltage into an intermediate voltage;
   a second switched capacitor converter comprising:
      an input for obtaining the intermediate voltage, and a second switch array comprising a second plurality of individually controllable semiconductor switches and a plurality of internal flying capacitors configurable to form one or more individual converter topologies of the second switched capacitor for converting the intermediate voltage into a DC output voltage;
   wherein the integrated circuit switched capacitor DC-DC converter also comprises a controller connected to respective control terminals of the first and second individually controllable semiconductor switches of the first and second switch arrays respectively; and
   wherein the second switched capacitor converter comprises an output voltage regulator, the output voltage regulator comprising:
      a reference voltage input for receipt of a first DC reference voltage and a feedback voltage input for receipt of a feedback voltage representative of the DC output voltage; and
      wherein the controller is configured to generate respective clock phases for the second plurality of individually controllable semiconductor switches of the second switch array to adjust the DC output voltage.

16. An integrated circuit switched capacitor DC-DC converter comprising:
   a first switched capacitor converter comprising:
      a DC input for receipt of a battery supply voltage, and
      a first switch array comprising a first plurality of individually controllable semiconductor switches connectable to at least one external flying capacitor to form one or more individual converter topologies of the first switched capacitor converter for converting the battery supply voltage into an intermediate voltage;
   a second switched capacitor converter comprising:
      an input for obtaining the intermediate voltage, and a second switch array comprising a second plurality of individually controllable semiconductor switches and a plurality of internal flying capacitors configurable to form one or more individual converter topologies of the second switched capacitor for converting the intermediate voltage into a DC output voltage;

wherein the integrated circuit switched capacitor DC-DC converter also comprises a controller connected to respective control terminals of the first and second individually controllable semiconductor switches of the first and second switch arrays respectively; and wherein the controller is configured to select the topology of the second switched capacitor converter such that an intrinsic energy efficiency of the second switched capacitor converter is maximum;

the intrinsic energy efficiency being $\eta_1 = VCR/iVCR = Vo1/(Vint*iVCR)$;

wherein VCR=voltage conversion ratio of the selected converter topology;

wherein iVCR=desired voltage conversion ratio; and wherein Vint=the intermediate voltage.

17. An integrated circuit switched capacitor DC-DC converter comprising:
a first switched capacitor converter comprising:
a DC input for receipt of a battery supply voltage, and
a first switch array comprising a first plurality of individually controllable semiconductor switches connectable to at least one external flying capacitor to form one or more individual converter topologies of the first switched capacitor converter for converting the battery supply voltage into an intermediate voltage;
a second switched capacitor converter comprising:
an input for obtaining the intermediate voltage, and
a second switch array comprising a second plurality of individually controllable semiconductor switches and a plurality of internal flying capacitors configurable to form one or more individual converter topologies of the second switched capacitor for converting the intermediate voltage into a DC output voltage;
wherein the integrated circuit switched capacitor DC-DC converter also comprises a controller connected to respective control terminals of the first and second individually controllable semiconductor switches of the first and second switch arrays respectively; and
wherein a total capacitance of the at least one external flying capacitor is larger than 500 nF.

18. An integrated circuit switched capacitor DC-DC converter comprising:
a first switched capacitor converter comprising:
a DC input for receipt of a battery supply voltage, and
a first switch array comprising a first plurality of individually controllable semiconductor switches connectable to at least one external flying capacitor to form one or more individual converter topologies of the first switched capacitor converter for converting the battery supply voltage into an intermediate voltage;
a second switched capacitor converter comprising:
an input for obtaining the intermediate voltage, and
a second switch array comprising a second plurality of individually controllable semiconductor switches and a plurality of internal flying capacitors configurable to form one or more individual converter topologies of the second switched capacitor for converting the intermediate voltage into a DC output voltage;
wherein the integrated circuit switched capacitor DC-DC converter also comprises a controller connected to respective control terminals of the first and second individually controllable semiconductor switches of the first and second switch arrays respectively; and
wherein a total capacitance of the plurality of internal flying capacitors is smaller than 22 nF.

19. A head-wearable hearing device comprising the integrated circuit switched capacitor DC-DC converter according to claim 1.

20. The head-wearable hearing device of claim 19, further comprising at least one rechargeable battery cell connectable to the DC input for supplying the battery supply voltage.

21. An integrated circuit switched capacitor DC-DC converter comprising:
a first switched capacitor converter comprising:
a DC input for receipt of a battery supply voltage, and
a first switch array comprising a first plurality of individually controllable semiconductor switches connectable to at least one external flying capacitor to form one or more individual converter topologies of the first switched capacitor converter for converting the battery supply voltage into an intermediate voltage;
a second switched capacitor converter comprising:
an input for obtaining the intermediate voltage, and
a second switch array comprising a second plurality of individually controllable semiconductor switches and a plurality of internal flying capacitors configurable to form one or more individual converter topologies of the second switched capacitor for converting the intermediate voltage into a DC output voltage;
wherein the integrated circuit switched capacitor DC-DC converter also comprises a controller connected to respective control terminals of the first and second individually controllable semiconductor switches of the first and second switch arrays respectively; and
wherein the controller is implemented as a part of the second switched capacitor converter.

22. The integrated circuit switched capacitor DC-DC converter according to claim 17, wherein the controller is configured to determine a converter topology of the first switched capacitor converter, and to determine a converter topology of the second switched capacitor converter.

23. The integrated circuit switched capacitor DC-DC converter according to claim 17, wherein the controller is configured to:
determine, directly or indirectly, a charge state of the at least one external flying capacitor,
compare the charge state to a predetermined charge criterion to obtain a comparison result, and
recharge the at least one external flying capacitor via the first switch array based on the comparison result.

24. The integrated circuit switched capacitor DC-DC converter according to claim 23, wherein the controller is configured to recharge the at least one external flying capacitor by toggling respective states of first and second pairs of the first plurality of individually controllable semiconductor switches of the first switch array to connect the least one external flying capacitor between the DC input of the first switched capacitor converter and the input of the second switched capacitor converter.

25. The integrated circuit switched capacitor DC-DC converter according to claim 23, wherein the predetermined charge criterion for the at least one external flying capacitor comprises one or more of:
- a switching frequency of the second switched capacitor converter,
- a voltage difference between the DC output voltage and a set-point or target voltage of the DC output voltage,
- a voltage drop across the at least one external flying capacitor.

26. The integrated circuit switched capacitor DC-DC converter according to claim 23, wherein the controller is configured to recharge the at least one external flying capacitor at a default or minimum switching frequency.

27. The integrated circuit switched capacitor DC-DC converter according to claim 26, wherein the default or minimum switching frequency is higher than 16 kHz.

28. The integrated circuit switched capacitor DC-DC converter according to claim 17, wherein the controller is configured to recharge the at least one external flying capacitor irrespective of a predetermined charge state to set a lower bound of a switching frequency of the first switched capacitor converter.

29. The integrated circuit switched capacitor DC-DC converter according to claim 17, wherein a minimum switching frequency of the second switched capacitor converter is higher than 1 MHz.

30. The integrated circuit switched capacitor DC-DC converter according to claim 17, wherein the first plurality of the individually controllable semiconductor switches of the first switch array comprises:
- a first pair of individually controllable semiconductor switches driven by a first clock phase ($p_1$) of a clock signal,
- a second pair of individually controllable semiconductor switches driven by a second, and non-overlapping, clock phase ($p_2$) of the clock signal;
- the first pair of individually controllable semiconductor switches configured to charge the least one external flying capacitor from the battery supply voltage during the first clock phase, and the second pair of individually controllable semiconductor switches configured to discharge the least one external flying capacitor to the input of the second switched capacitor converter during the second clock phase.

31. The integrated circuit switched capacitor DC-DC converter according to claim 17, further comprising a bypass circuit configured to allow the controller to bypass the second switched capacitor converter.

32. A head-wearable hearing device comprising the integrated circuit switched capacitor DC-DC converter according to claim 17.

33. The integrated circuit switched capacitor DC-DC converter according to claim 18, wherein the controller is configured to determine a converter topology of the first switched capacitor converter, and to determine a converter topology of the second switched capacitor converter.

34. The integrated circuit switched capacitor DC-DC converter according to claim 18, wherein the controller is configured to:
- determine, directly or indirectly, a charge state of the at least one external flying capacitor,
- compare the charge state to a predetermined charge criterion to obtain a comparison result, and
- recharge the at least one external flying capacitor via the first switch array based on the comparison result.

35. The integrated circuit switched capacitor DC-DC converter according to claim 34, wherein the controller is configured to recharge the at least one external flying capacitor by toggling respective states of first and second pairs of the first plurality of individually controllable semiconductor switches of the first switch array to connect the least one external flying capacitor between the DC input of the first switched capacitor converter and the input of the second switched capacitor converter.

36. The integrated circuit switched capacitor DC-DC converter according to claim 34, wherein the predetermined charge criterion for the at least one external flying capacitor comprises one or more of:
- a switching frequency of the second switched capacitor converter,
- a voltage difference between the DC output voltage and a set-point or target voltage of the DC output voltage,
- a voltage drop across the at least one external flying capacitor.

37. The integrated circuit switched capacitor DC-DC converter according to claim 34, wherein the controller is configured to recharge the at least one external flying capacitor at a default or minimum switching frequency.

38. The integrated circuit switched capacitor DC-DC converter according to claim 37, wherein the default or minimum switching frequency is higher than 16 kHz.

39. The integrated circuit switched capacitor DC-DC converter according to claim 18, wherein the controller is configured to recharge the at least one external flying capacitor irrespective of a predetermined charge state to set a lower bound of a switching frequency of the first switched capacitor converter.

40. The integrated circuit switched capacitor DC-DC converter according to claim 18, wherein a minimum switching frequency of the second switched capacitor converter is higher than 1 MHz.

41. The integrated circuit switched capacitor DC-DC converter according to claim 18, wherein the first plurality of the individually controllable semiconductor switches of the first switch array comprises:
- a first pair of individually controllable semiconductor switches driven by a first clock phase ($p_1$) of a clock signal,
- a second pair of individually controllable semiconductor switches driven by a second, and non-overlapping, clock phase ($p_2$) of the clock signal;
- the first pair of individually controllable semiconductor switches configured to charge the least one external flying capacitor from the battery supply voltage during the first clock phase, and the second pair of individually controllable semiconductor switches configured to discharge the least one external flying capacitor to the input of the second switched capacitor converter during the second clock phase.

42. The integrated circuit switched capacitor DC-DC converter according to claim 18, further comprising a bypass circuit configured to allow the controller to bypass the second switched capacitor converter.

43. A head-wearable hearing device comprising the integrated circuit switched capacitor DC-DC converter according to claim 18.

* * * * *